INVENTOR
JOSEPH MULLAN

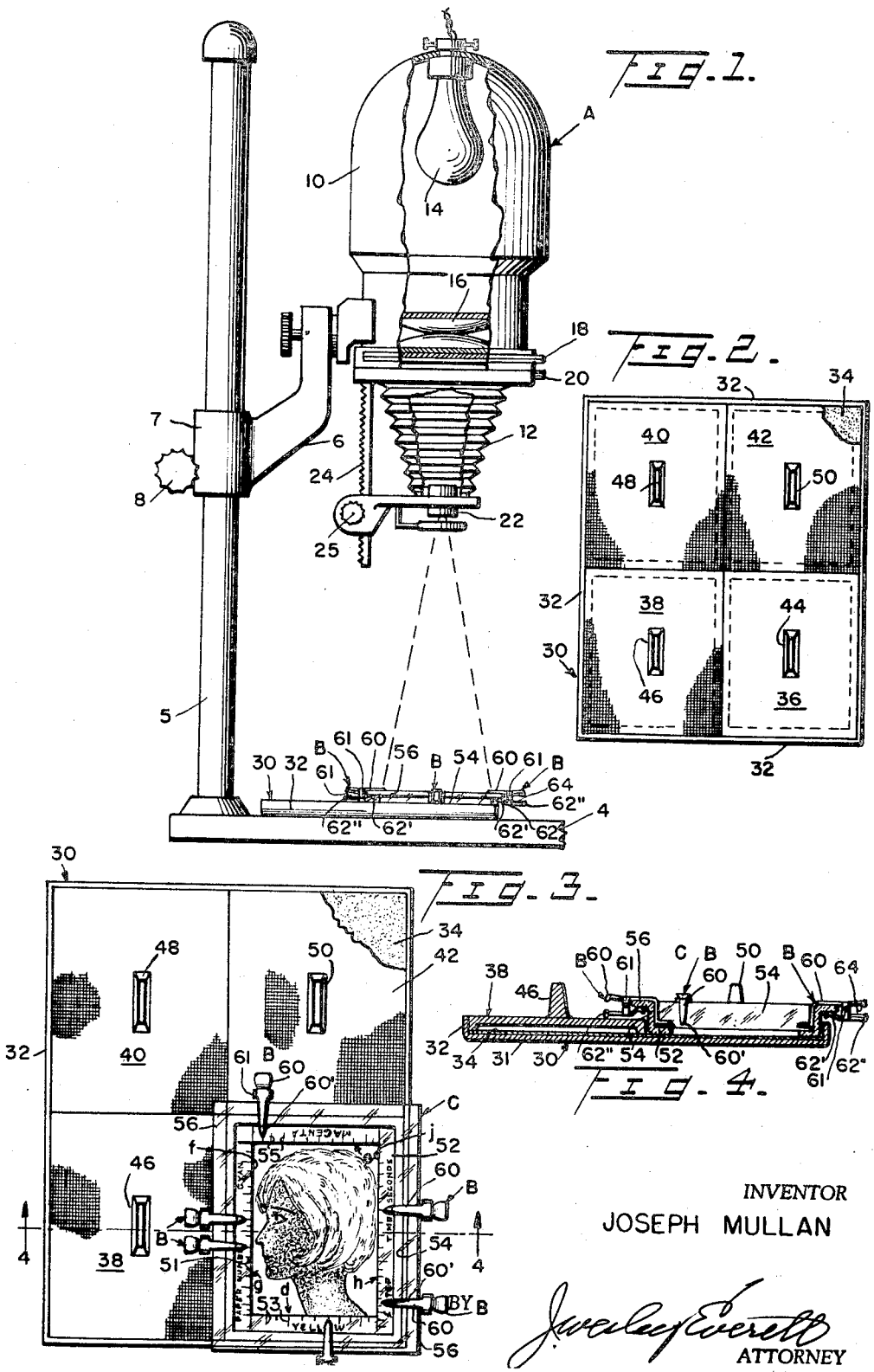
Nov. 5, 1968     J. MULLAN     3,409,359
PHOTO PRINT DATA DESIGNATING DEVICE
Filed Oct. 23, 1965     3 Sheets-Sheet 1
INVENTOR
JOSEPH MULLAN
ATTORNEY Nov. 5, 1968 J. MULLAN 3,409,359
PHOTO PRINT DATA DESIGNATING DEVICE
Filed Oct. 23, 1965 3 Sheets-Sheet 2

BY *J. Wesley Everett*
ATTORNEY

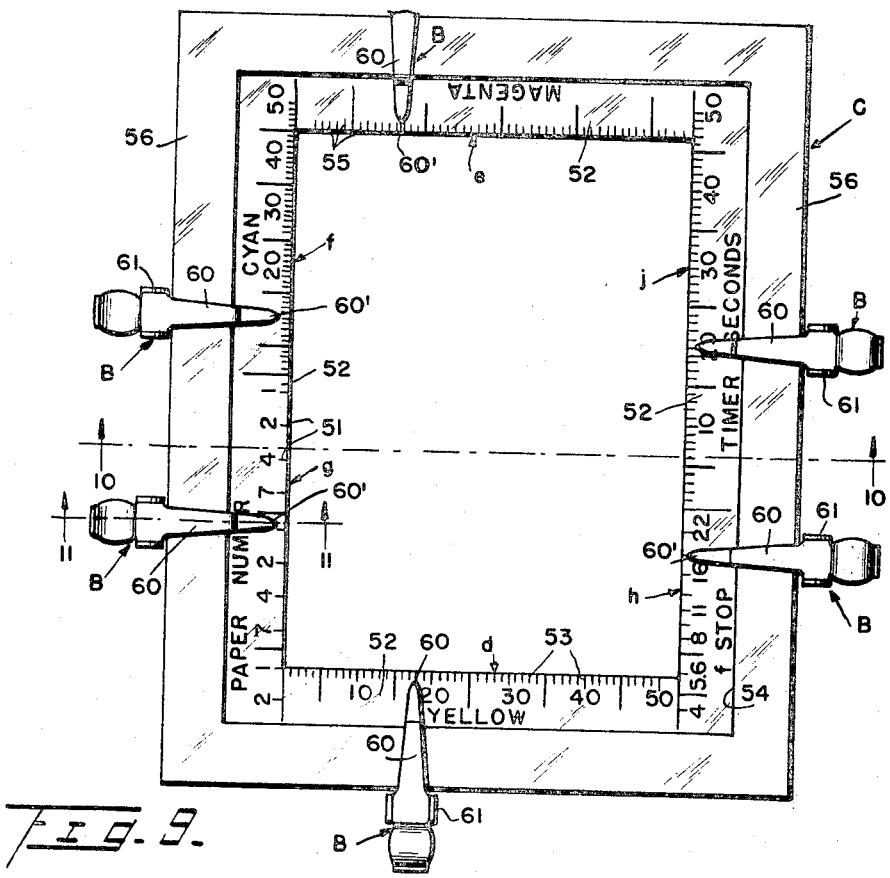
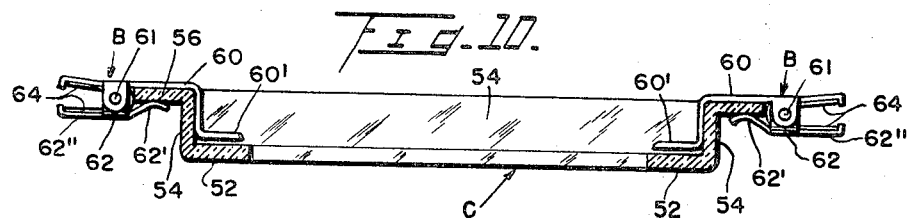
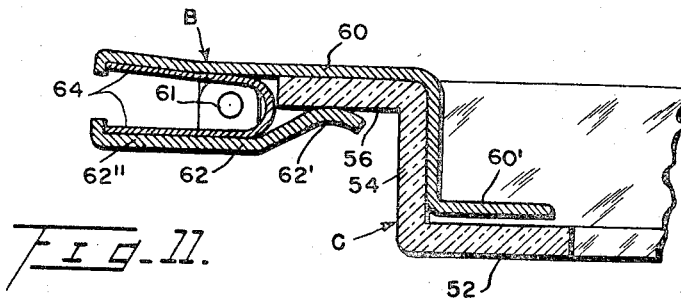

United States Patent Office 3,409,359
Patented Nov. 5, 1968

3,409,359
PHOTO PRINT DATA DESIGNATING DEVICE
Joseph Mullan, 217 Northway, Baltimore, Md. 21218
Filed Oct. 23, 1965, Ser. No. 502,981
5 Claims. (Cl. 355—40)

ABSTRACT OF THE DISCLOSURE

A device for photographically recording certain data on a photographic print for use in duplicating the same at a future time. A tray for receiving a sheet of print paper; a mask composed of a number of individually removable and interchangeable sections of equal area covering the area of the tray, a frame of transparent material of such size as to occupy the area of any one mask section. The frame has opaque indicia markings thereon and one or more mark designating elements clamped on the frame at selected positions. The indicia markings and impressions of the mark designating elements are reproduced on the photographic print as the latter is printed.

---

The present invention relates to the placing of certain data about the border of prints and in particular, to the recording of the data at the time the print is made for use in duplicating a particular photographic print at some future time.

The primary object of the invention is to provide a device for use with making prints wherein the data as to time of exposure, size of lens opening, paper number, color combination of the filter pack, etc. may be recorded about the border of the print at the time the print is made.

Another object of the invention is to provide means that may be incorporated with certain present reproducing equipment.

Still another object of the invention is to provide a novel method of locating the markings about the border of the said prints in a new, expedient and convenient manner for standardization of the prints.

While several objects of the invention have been pointed out, other objects, uses and advantages will be more apparent as the nature of the invention is more fully described, including its novel construction, combination and arrangement of its parts as shown in the accompanying drawings and detailed description to follow.

In the drawings:

FIGURE 1 is a view partly in elevation and partly in section showing a standard type enlarger having a support associated therewith.

FIGURE 2 is a plan view of a movable easel or tray for a sheet of developing paper.

FIGURE 3 is an enlarged plan view of the easel similar to that shown in FIGURE 2 showing the first step in making a print.

FIGURE 4 is a sectional view taken on line 4—4 of FIGURE 3.

FIGURE 9 is an enlarged plan view of a mark designating frame for carrying some of the most important reference data to be photographed about the border of the print.

FIGURE 10 is a sectional view taken on line 10—10 of FIGURE 9.

FIGURE 11 is an enlarged fragmentary sectional view of one of the adjustable mark indicating elements or tabs, carried by the mark designating frame.

In reference to the drawings like and similar reference characters and uses to designate like and similar parts throughout the several views.

Figure 5:
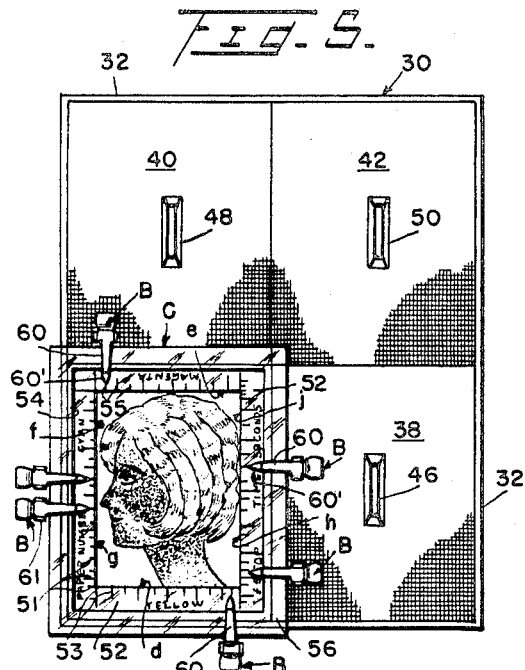
FIGURES 5, 6 and 7 are plan views similar to that shown in FIGURE 3 illustrating subsequent steps taken in making additional prints upon a single sheet of developing paper.

While four prints are illustrated as being made on a single sheet of developing paper, the invention is not limited to this specific number, as any number of prints and the size of the paper may be used that will best satisfy the needs and purposes of the user.

The data designating assembly is used in cooperation with a conventional enlarger A. These enlargers are usually mounted on a stand having a base or easel 4 and a standard 5 supporting an arm 6 which is adjustable and secured along the standard 5 by operating a clamp 7, having a tightening screw 8.

The enlarger itself, normally consists of a substantially rigid light proof dome 10, an adjustable bellows portion 12, a light source 14, a condenser 16, a slidable filter pack frame 18, for holding a filter pack of a predetermined color combination, if the prints are to be made in color, from a color film, a negative holding slide 20, for holding a film and a lens 22. The enlarger is also provided with means for adjusting the bellows portion 12 and the lens 22 relative to the fixed portion 10 carrying the negative for focusing the picture on the easel, or on a surface supported upon the easel. The bellows adjusting means comprises a rotatable toothed member (not shown) adapted to engage a toothed rack 24 secured to the fixed portion 10, whereby the bellows portion 12 may be moved relative to the fixed portion 10 by rotating the hand wheel 25 or other suitable means.

The data designating assembly is made up of several interchangeable parts. FIGURE 2 is a plan view of one part of the assembly which comprises an easel in the form of a shallow tray like element 30 having a bottom 31 (see FIG. 4) and low upturned side edges 32. This easel is of such size as to preferably receive a standard size sheet of developing paper 34. A mask or cover is provided for the upper surface of the tray and the paper 34 carried therein. The mask is composed of a plurality of individual sections 36, 38, 40 and 42, which are individually removable without disturbing the remaining mask sections. The area of the combined mask elements are adapted to cover this particular sheet, and are preferably of the same size and cover the sheet completely. For convenient handling each of the individual mask sections there is provided a handle, such as shown at 44, 46, 48 and 50.

For the purpose to be described later, the individual mask elements are of certain colors. Mask element 36 is white and the remaining mask elements 38, 40 and 42 are preferably of a dark color, such as black.

In having the easel and paper covered with a plurality of equal size mask elements provides for making an equal number of test prints of equal size on the single sheet of developing paper. However, the particular number of prints made on a single sheet of developing paper may be increased or decreased as desired. Likewise the size of the developing sheet may be of any convenient or desired size, depending on the size of the easel and the individual masking elements.

The marking of the individual print is designated by what is sometimes referred to as a "Print Analyzer" which comprises two primary parts, a frame C and a marking indicating elements B. The frame C is preferably constructed of a transparent material and of cross-sectional Z shape (see FIGURES 10 and 11). The frame is provided with a horizontal lower lip portion 52 adapted to extend inwardly about and adjacent the border of the area of the paper, defined by any one of the cover elements. Extending outwardly from the upper edge of the side wall 54 is a top lip portion 56, which is preferably substantially in a parallel plane with the plane of the lip portion 52. This frame is adapted to occupy the exact area occupied by any one of the cover elements 36, 38, 40 and 42, and while preferably constructed entirely of transparent material, only the lower inner lip 52 carrying the indicia provides the most advantage.

The mark designating elements B are constructed of any suitable material and is of such design as to be releasably secured about and to the frame C. Each element is provided with an upper portion 60 which extends over the upper edge 56 of the frame C and vertically along the side wall portion 54 of the frame and inwardly over the inner lip 52 thereof, as shown at 60'. The portion 60' is formed substantially parallel with the inner frame portion 52 which is the portion resting upon, or just above the developing paper 34. This portion 60' of the mark designating element B is either constructed preferably of opaque material, or colored to cause it to be resistant to, at least, some degree to the passage of light. In the construction of the mark designating element B, there is connected to the member 60, by the hinge 61, an arm 62 having a clamping piece 62' and a finger piece 62". The clamp piece is urged toward the under surface of the upper element 60 by an expandable spring element 64. The clamp piece 62' when at rest is clamped to the outward edge 56 of the frame and is releasable when the finger piece is moved against the tension of the spring 64. When the clamping piece is moved to release the mark indicating element B, the element may be moved along the frame at will to relocate the element where it may be again fixed to the frame by releasing the finger piece 62'. These mark indicating elements may be removed or added to the frame, depending on what the operator wishes to mark. In FIGURE 9 there is shown six of these mark indicators for marking each print with certain data for future information concerning the reproduction of that particular print, or picture.

About the inner lip portion 52 of the frame there are certain indices and/or markings 51, 53, 55, etc., to be transmitted to the border of the test print, as shown in FIGURE 9. The indices on the portion 52 of the frame is also opaque, as are the portions 60' of the mark indicating elements B. As the portion 60' of the mark locating element and the indices are both opaque, they will block off the light to the print, when the print is made, and in developing the print the indices will show up as white on the border of the print as the light does not pass through those opaque mark designating elements 60' and the opaque indices. For example, the frame C as shown in FIGURE 9 has one end d designated for the color "yellow"; the opposite end e is designated for the color "magenta" and a part of one side f is designated as the color "Cyan." Another part g of the same side is marked for the number of the developing paper. The opposite side h has the "f-stop" markings and another portion j of the same side is marked for the time in seconds of the exposure.

To use the present device, the negative is placed into the enlarger A and the enlarger is placed in some convenient location. The picture is focused and composed on the upper surface of the easel or tray 30. This may all be done with the outside lights turned out. The masking or cover elements 36, 38, 40 and 42 are placed nearby for convenience. The next step is to extinguish the surrounding lights and place the developing, or printing, paper within the easel or tray 30. The easel is then manipulated, if not already in position, under the lens until the proper section of the negative is concentrated on the white masking element 36.

At this point the outside lights may be turned on and the elements on the enlarger and the print analyzer are set to produce, to the best judgment of the operator, a satisfactory print.

The setting comprises, the setting of the f-stop and the timer in seconds on the enlarger which are properly designated on the print analyzer by the mark indicating elements B. A filter pack, if a colored print, is also selected and placed in the developer and the ratio of colors of the pack is also indicated on the print analyzer by the mark indicating elements as previously described. Other data may also be indicated on the print by the addition of other mark designating elements, such as, the paper number of the developing or print paper, etc.

With the setting of the enlarger and the print analyzer completed, and the easel in position under the lens, the surrounding lights are extinguished, the white masking element 36 is removed and the print analyzer frame C is inserted in the place of the removed masking element 36 and the timer controlling light 10 is tripped which maintains the light 10 for a predetermined period after which frame C is removed and one of the dark masking elements is moved over to cover the area from which the frame C was removed, and the white masking element 36 is placed into the space just uncovered by the dark masking element used to cover the printed area. With all the areas of the developing paper covered the surrounding lights are turned on to provide light to reset the enlarger and/or the print analyzer.

It is to be noted that when the print is made all colored masking elements are in place over the easel and only the white masking element 46 is removed which space is occupied by the print analyzer, or frame C when the print is made.

After the first print has been completed and the complete area of the developing paper has been masked, the surrounding lights may be turned on. Preparations may now be made to make a second print. A modified setting of the enlarger may now be made and indicated on the print analyzer, the ratio of the colors in the filter pack may also be modified and noted on the print analyzer. After the new setting has been made, the surrounding lights are again extinguished and the enlarger turned on and the easel manipulated until the same section of the negative previously printed is again concentrated on the white masking block 36. The enlarger light is turned off, and with the room dark, remove the white element 36 and insert the print analyzer, or frame C, in the space preoccupied by the white masking element. By tripping the light timer for the light 10, the second print will be made containing the new markings about the border of the print. Again the frame C is removed from the easel and another dark masking element is slid over to cover the area or the paper on which the print was just made and the area vacated by the dark masking element is again covered by the white masking element 36.

After the second print is made the enlarger and filter pack may be again reset by the operator to produce a further modification of the print he may desire, and the operation is repeated. This procedure is followed for each of the areas covered by each of the several masking elements.

It should be noted that setting of the enlarger, selection of colored filter packs, etc., is generally made by someone who has experience in the handling and operation of enlarging apparatus.

The white masking element is always used for the area upon which the next print is to be made for the reason that the white surface of the masking element is only suitable to align the area with the lens.

Figure 6:
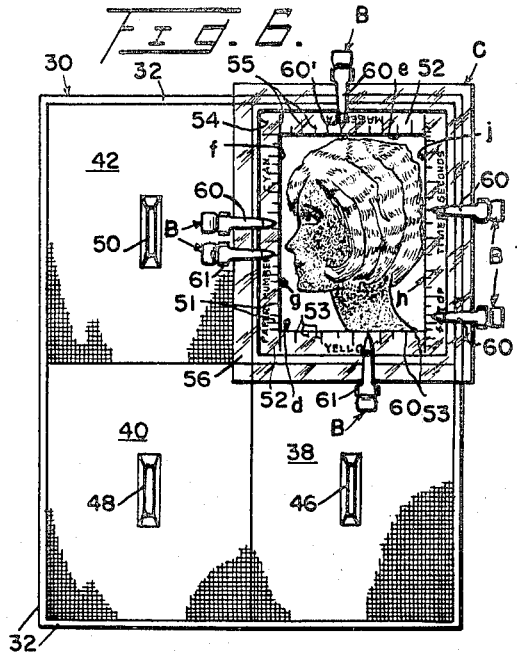
Figure 7:
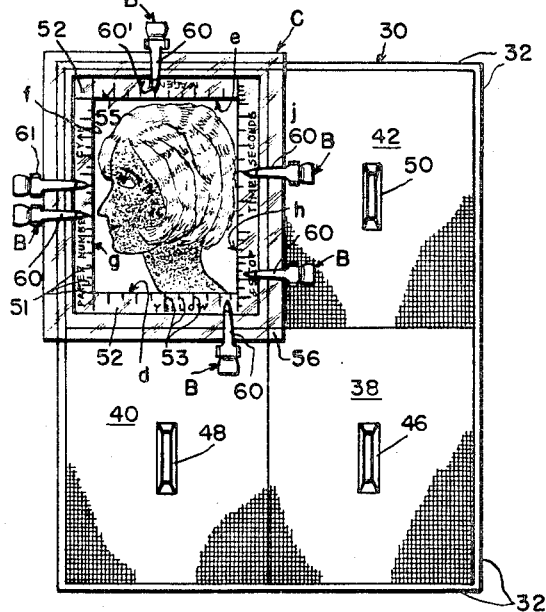
Figure 8:
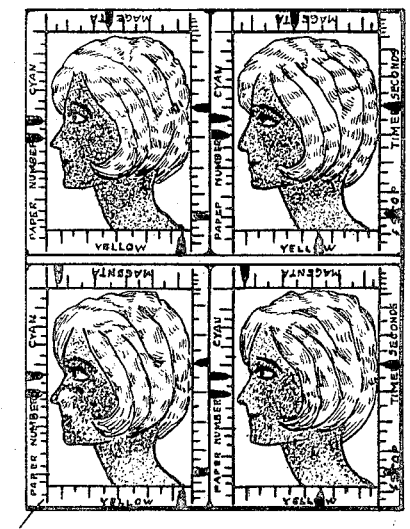
FIGURE 8 is a plan view of 4 prints taken on a single sheet of standard developing paper showing different data marking surrounding the border of each print.

The exposure of the different areas are shown in FIGURES 5, 6, and 7, and FIGURE 8 illustrates a sheet in which all the area has been exposed, each area having indicated about its border or margin certain indicia previously referred to. Any number of sheets may be made until the print of a particular liking has been produced. The prints may then be retained and referred to when it is desired to produce at some future time a substantial copy of the print, which may be produced by analyzing the marking on the border of the print as to time exposure, F stop, filter pack, paper number, etc., and setting and operating the enlarger and selecting the colors for the filter pack as shown by the marking on the prints.

While the present invention has been illustrated and described in a specific manner, it is not intended as a limitation as the scope of the invention is best defined in the appended claims.

I claim:
1. A data designating assembly for use in marking prints comprising:
   (a) a tray having an area of a predetermined dimension having a bottom portion and low side portions adapted to receive a sheet of developing paper and a plurality of separate cover elements of equal size adapted to cover substantially the tray area when used simultaneously;
   (b) a mark designating frame adapted to occupy the space vacated by any one of the separate cover elements, said frame having at least a transparent portion extending over and above the border of the said developing paper having fixed opaque indicia spaced along its surface;
   (c) one or more movable data indicating elements adapted to be carried by said frame, being temporarily fixable along the frame at predetermined points and extending adjacent the surface of the frame portion carrying opaque indicia thereon for indicating photographically about the border of the print the indicia selected on the frame.

2. In a data designating assembly for prints as claimed in claim 1 wherein the mark indicating elements are each provided with clamping means adapted to be releasably clamped to the frame for holding the said element in position on the frame.

3. A combination data designating frame and data indicating element for use with an apparatus for designating markings on prints comprising; a frame of such dimensions as to extend about an area of developing paper, having at least a transparent portion extending about and over a portion of the border of the area of the developing paper, fixed opaque indicia spaced along the frame portion extending over the border of the inner area of the frame, one or more movable mark indicating elements adapted to be carried by said frame and being temporarily fixable along the frame and extending adjacent the fixed opaque indicia carried by the frame for indicating the indicia selected on the frame.

4. A combination apparatus for producing data carrying prints comprising; an enlarger including a light source, a filter pack, a negative, a lens and a support base below the said lens and a data designating assembly for said prints, comprising an easel having a bottom and low side portions adapted to rest upon said support, the bottom of said easel having an area of predetermined dimensions for receiving a sheet of developing paper and a plurality of separate masking elements for said sheet, said masking elements being of the same size and collectively extending over the dimensions of the bottom of the easel, a frame adapted to occupy the space of one of the separate masking elements having at least a transparent inner edge portion extending over and about the border of the print, said frame having fixed opaque indicia marking about the inner edge of the frame positioned over the edge of the print, one or more movable mark indicator elements having at least an opaque portion extending over the opaque marking positioned about the edge of the frame for indicating the selected marking on the frame, whereby when the light is projected through the negative to the developing paper the opaque mark indicating element and opaque marking on the said frame will record said selected data in the border of the print.

5. A method of providing data on photo prints comprising the steps of designating an area of photographic paper upon which a print is to be made, placing a transparent frame bearing opaque indicia upon the paper to define a border therearound, attaching one or more opaque markers on the frame to designate selected indicia and exposing the upper surface of said designated area to a source of light that has passed through a photographic negative and focusing lens whereby the indicia on the frame and the designating markers positioned thereon will be registered on the border of the print simultaneously with the picture from the negative.

References Cited

UNITED STATES PATENTS

| | | | |
|---|---|---|---|
| 1,901,186 | 3/1933 | Norworth | 95—1.1 |
| 2,037,764 | 4/1936 | Daneker | 95—1.1 |
| 2,441,843 | 5/1948 | Raiff et al. | 88—24 |

NORTON ANSHER, *Primary Examiner.*

W. A. SIVERTSON, *Assistant Examiner.*